(12) United States Patent
Das et al.

(10) Patent No.: US 10,025,822 B2
(45) Date of Patent: Jul. 17, 2018

(54) OPTIMIZING EXECUTION PLANS FOR IN-MEMORY-AWARE JOINS

(71) Applicant: Oracle International Corporation, Redwood Shores, CA (US)

(72) Inventors: Dinesh Das, Redwood City, CA (US); Mohamed Zait, San Jose, CA (US); Jiaqi Yan, San Carlos, CA (US); Niloy Mukherjee, Belmont, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 383 days.

(21) Appl. No.: 14/806,601

(22) Filed: Jul. 22, 2015

(65) Prior Publication Data

US 2016/0350375 A1 Dec. 1, 2016

Related U.S. Application Data

(60) Provisional application No. 62/168,050, filed on May 29, 2015.

(51) Int. Cl.
*G06F 17/30* (2006.01)
*G06F 12/02* (2006.01)

(52) U.S. Cl.
CPC ...... *G06F 17/30463* (2013.01); *G06F 12/023* (2013.01); *G06F 17/30339* (2013.01);
(Continued)

(58) Field of Classification Search
CPC ......... G06F 17/30454; G06F 17/30466; G06F 17/30592; G06F 17/30483;
(Continued)

(56) References Cited

U.S. PATENT DOCUMENTS 4,782,325 A 11/1988 Jeppsson et al.
5,742,792 A 4/1998 Yanai et al.
(Continued)

FOREIGN PATENT DOCUMENTS

EP 2 608 070 A1 6/2013
GB 1 332 631 A 10/1973
WO WO2007/078444 A1 7/2007

OTHER PUBLICATIONS

U.S. Appl. No. 14/337,179, filed 074/21/2014, Notice of Allowance dated Jul. 29, 2015.
(Continued)

*Primary Examiner* — Anh Ly
(74) *Attorney, Agent, or Firm* — Hickman Palermo Becker Bingham LLP

(57) ABSTRACT

Techniques are described herein for accurately estimating the cost of performing a join against "mirror format" data that is at least partially located in volatile memory. Mirror format data is a copy of on-disk data (a.k.a. persistent format data) stored in a different format in volatile memory. In the preferred embodiment described herein, the mirror format data is stored in a column-major format, while the persistent format data is stored in a row-major format. The cost of performing a join query with a particular join method against mirror format data is different than the cost of performing the same particular join method against persistent format data. Techniques described herein for estimating the cost of multiple join query execution plans, and selecting the most optimized plan.

16 Claims, 8 Drawing Sheets

(52) U.S. Cl.
CPC .. *G06F 17/30371* (2013.01); *G06F 17/30466* (2013.01); *G06F 17/30477* (2013.01); *G06F 17/30498* (2013.01); *G06F 17/30569* (2013.01); *G06F 2212/1044* (2013.01)

(58) Field of Classification Search
CPC ......... G06F 17/30864; G06F 17/30377; G06F 8/65; G06F 17/30442; G06F 17/30292; G06F 17/30; G06F 17/3033; G06F 17/30917; G06F 17/30598
See application file for complete search history.

(56) References Cited

U.S. PATENT DOCUMENTS

| | | | |
|---|---|---|---|
| 5,778,430 A | 7/1998 | Ish et al. | |
| 5,870,759 A | 2/1999 | Bauer et al. | |
| 6,009,432 A | 12/1999 | Tarin | |
| 6,609,131 B1* | 8/2003 | Zait | G06F 9/5066 707/E17.004 |
| 6,954,776 B1* | 10/2005 | Cruanes | G06F 9/5066 709/201 |
| 7,010,789 B1 | 3/2006 | Kimelman | |
| 7,020,661 B1 | 3/2006 | Cruanes | |
| 7,149,769 B2 | 12/2006 | Lubbers et al. | |
| 7,188,113 B1 | 3/2007 | Thusoo | |
| 7,849,221 B2 | 12/2010 | Kumar | |
| 8,244,780 B1 | 8/2012 | Narayanan | |
| 8,433,684 B2 | 4/2013 | Munoz | |
| 8,856,484 B2 | 10/2014 | Ben-Tsion et al. | |
| 9,292,564 B2 | 3/2016 | Kamp et al. | |
| 2002/0194157 A1* | 12/2002 | Zait | G06F 17/3033 707/E17.045 |
| 2004/0215904 A1 | 10/2004 | Gopisetty | |
| 2005/0055380 A1 | 3/2005 | Thompson et al. | |
| 2005/0131879 A1* | 6/2005 | Ghosh | G06F 17/30445 707/E17.009 |
| 2006/0013078 A1 | 1/2006 | Goodman | |
| 2006/0173833 A1 | 8/2006 | Purcell et al. | |
| 2006/0182046 A1 | 8/2006 | Dageville | |
| 2006/0218194 A1 | 9/2006 | Yalamanchi | |
| 2007/0050328 A1 | 3/2007 | Li | |
| 2007/0208695 A1 | 9/2007 | Burger | |
| 2008/0033914 A1 | 2/2008 | Cherniack | |
| 2008/0059492 A1 | 3/2008 | Tarin | |
| 2008/0086480 A1 | 4/2008 | Srivastava | |
| 2008/0086495 A1 | 4/2008 | Kizitunc | |
| 2008/0235280 A1 | 9/2008 | Schoen | |
| 2008/0256250 A1 | 10/2008 | Wakefield | |
| 2008/0281784 A1 | 11/2008 | Zane et al. | |
| 2008/0281865 A1 | 11/2008 | Price et al. | |
| 2009/0063516 A1 | 3/2009 | Wang | |
| 2009/0100089 A1* | 4/2009 | Eadon | G06F 17/30486 707/E17.054 |
| 2009/0119247 A1* | 5/2009 | Bellamkonda | G06F 17/30498 707/E17.005 |
| 2009/0254522 A1 | 10/2009 | Chaudhuri | |
| 2009/0307290 A1 | 12/2009 | Barsness et al. | |
| 2010/0106711 A1 | 4/2010 | Graefe | |
| 2010/0235335 A1 | 9/2010 | Heman et al. | |
| 2010/0235347 A1* | 9/2010 | Chaudhuri | G06F 17/30463 707/713 |
| 2010/0250549 A1 | 9/2010 | Muller et al. | |
| 2011/0029569 A1 | 2/2011 | Ganesh et al. | |
| 2011/0047144 A1* | 2/2011 | Han | G06F 17/30445 707/718 |
| 2011/0119249 A1 | 5/2011 | Flatz | |
| 2011/0137890 A1* | 6/2011 | Bestgen | G06F 17/30466 707/719 |
| 2011/0138123 A1 | 6/2011 | Aditya et al. | |
| 2011/0225123 A1 | 9/2011 | D'Souza | |
| 2012/0047158 A1 | 2/2012 | Lee | |
| 2012/0173515 A1 | 7/2012 | Jeong et al. | |
| 2012/0310916 A1 | 12/2012 | Abadi | |
| 2012/0323971 A1 | 12/2012 | Pasupuleti | |
| 2013/0159285 A1 | 6/2013 | Dees | |
| 2013/0166588 A1 | 6/2013 | Gruschko | |
| 2014/0040218 A1 | 2/2014 | Kimura et al. | |
| 2014/0067791 A1 | 3/2014 | Idicula | |
| 2014/0075493 A1 | 3/2014 | Krishnan et al. | |
| 2014/0108378 A1 | 4/2014 | Alpers | |
| 2014/0173702 A1 | 6/2014 | Wong | |
| 2014/0279838 A1 | 9/2014 | Tsirogiannis | |
| 2014/0317159 A1* | 10/2014 | Dhavale | G06F 3/0647 707/823 |
| 2015/0088811 A1 | 3/2015 | Hase et al. | |
| 2015/0088822 A1 | 3/2015 | Raja et al. | |
| 2015/0088824 A1 | 3/2015 | Kamp et al. | |
| 2015/0088830 A1 | 3/2015 | Kamp et al. | |
| 2015/0088926 A1 | 3/2015 | Chavan et al. | |
| 2015/0089125 A1 | 3/2015 | Mukherjee et al. | |
| 2015/0089134 A1 | 3/2015 | Mukherjee et al. | |
| 2015/0149704 A1 | 5/2015 | Lee | |
| 2015/0234895 A1 | 8/2015 | Erdogan | |
| 2015/0339350 A1 | 11/2015 | Baggett | |
| 2016/0026667 A1 | 1/2016 | Mukherjee et al. | |
| 2016/0034486 A1* | 2/2016 | Dageville | G06F 17/30132 707/747 |
| 2016/0036905 A1 | 2/2016 | Syed | |
| 2016/0048572 A1 | 2/2016 | Khandelwal | |
| 2016/0350347 A1 | 12/2016 | Das et al. | |
| 2016/0350371 A1 | 12/2016 | Das et al. | |
| 2017/0031988 A1 | 2/2017 | Sun | |
| 2017/0242767 A1 | 8/2017 | Wang | |

OTHER PUBLICATIONS

U.S. Appl. No. 14/337,179, filed Jul. 21, 2014, Office Action dated Dec. 29, 2014.
U.S. Appl. No. 14/337,179, filed Jul. 21, 2014, Interview Summary dated Jun. 17, 2015.
U.S. Appl. No. 14/337,179, filed Jul. 21, 2014, Final Office Action dated Apr. 10, 2015.
Schaffner, et al., "A Hybrid Row-Column OITP Database Architecture for Operational Reporting", dated 2009, 14 pages.
Ramamurthy, Ravishankar, "A Case for Fractured Mirrors" Proceedings of the 28th VLDB Conference, dated, 2002, 12 pages.
Phipps, Colin:, "Mapping Deflated Files", Internet Article, dated Jan. 6, 2013, http://zsync.moria.org.uk/paper/ch03s02.html, 3 pages.
Nirmesh, Malviya, "Recovery Algorithms for In-Memory OLTP Databases", Master of Science Thesis, dated Jul. 1, 2012, 66 pages.
Khalid Sayood:, "Introduction to data Compression", Morgan Kaufmann Publisher, dated Dec. 1996, 4 pages.
Farber et al., "SAP HANA Database—Data Management for Modern Business Applications", SIGMOD Record, dated Dec. 2011, vol. 40, No. 4, 8 pages.
Das, U.S. Appl. No. 14/806,614, filed Jul. 22, 2015, Office Action dated Dec. 6, 2017.
Das, U.S. Appl. No. 14/806,614, filed Jul. 22, 2015, Interview Summary dated Jan. 17, 2018.
Mukherjee, U.S. Appl. No. 14/806,411, filed Jul. 22, 2015, Office Action dated Oct. 4, 2017.
Muhkherjee, U.S. Appl. No. 14/806,411, filed Jul. 22, 2015, Office Action dated Oct. 4, 2017.
Das, U.S. Appl. No. 14/806,597, filed Jul. 22, 2015, Office Action dated Oct. 18, 2017.
Mukherjee, U.S. Appl. No. 14/806,411, filed Jul. 22, 2015, Notice of Allowance, dated Feb. 12, 2018.
Das, U.S. Appl. No. 14/806,614, filed Jul. 22, 2015, Notice of Allowance, dated Mar. 20, 2018.

* cited by examiner

OPTIMIZING EXECUTION PLANS FOR IN-MEMORY-AWARE JOINS

CROSS-REFERENCE TO RELATED APPLICATIONS; BENEFIT CLAIM

This application claims the benefit of U.S. Provisional Application No. 62/168,050, filed May 29, 2015, the entire contents of which is hereby incorporated by reference as if fully set forth herein, under 35 U.S.C. § 119(e).

This application is related to:

U.S. application Ser. No. 14/806,597, filed on the same day herewith entitled, "OPTIMIZER STATISTICS FOR IN-MEMORY TABLES"; and U.S. application Ser. No. 14/806,614, filed on the same day herewith entitled, "TECHNIQUES FOR EVALUATING QUERY PREDICATES DURING AN IN-MEMORY SCAN OF COLUMNAR UNITS."

The contents of both of which are incorporated herein by reference as if fully disclosed herein.

FIELD OF THE INVENTION

The present invention relates to data storage and retrieval techniques, and more specifically to improved computer-implemented techniques for optimizing execution plans for memory-aware joins.

BACKGROUND

Processing queries in a database system typically involves at least two phases: a compilation phase and an execution phase. During the compilation phase, the database system takes the query text that specifies the logical outcome of the query and generates an execution plan that can be executed based on the physical layout of the data.

A query optimizer may generate multiple valid query execution plans, each of which would produce a valid query answer if executed against the database. However, a query optimizer may select only one of the query execution plans for execution. The selection of a query execution plan by the query optimizer may be based on an estimated cost of executing the execution plan relative to the other candidate execution plans. A query optimizer may take into account several factors to generate the estimated cost, such as the number of rows that may be processed during each step of the execution, the operations to perform (e.g., joins, table scans), and the cost of accessing the data according to the specified execution plan.

A technique called a partition-wise join is an effective method for improving the performance of certain join queries in which two tables are joined by a partition key of at least one of the two tables on a multi-node cluster. Examples of partition-wise joins may be found in U.S. Pat. No. 6,609,131 filed Sep. 27, 1999, "PARALLEL PARTITION-WISE JOINS," filed by Mohamed Zait et al., the entire contents of which is hereby incorporated by reference as if fully set forth herein. The partition-wise join technique improves query execution performance by assigning each pair of corresponding partitions of the joined tables to a respective cluster process and having the cluster process scan the partitions and process the join. The partition-wise join technique can also be applied when the partitioned tables are populated in-memory in a dual format database system. Such systems are described, for example, in U.S. patent application Ser. No. 14/377,179, entitled "Mirroring, In Memory, Data From Disk To Improve Query Performance", filed Jul. 21, 2014, the contents of which is incorporated herein in its entirety.

However, even when a join query qualifies for an in-memory partition-wise join, it may not be cost-effective to do so if the cluster processes have to read a lot of rows from disk or the buffer cache. Unfortunately, there is no technique for determining when to apply a partition-wise join to a qualifying join query in the situation where the joined tables are populated, at least partially, in-memory.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
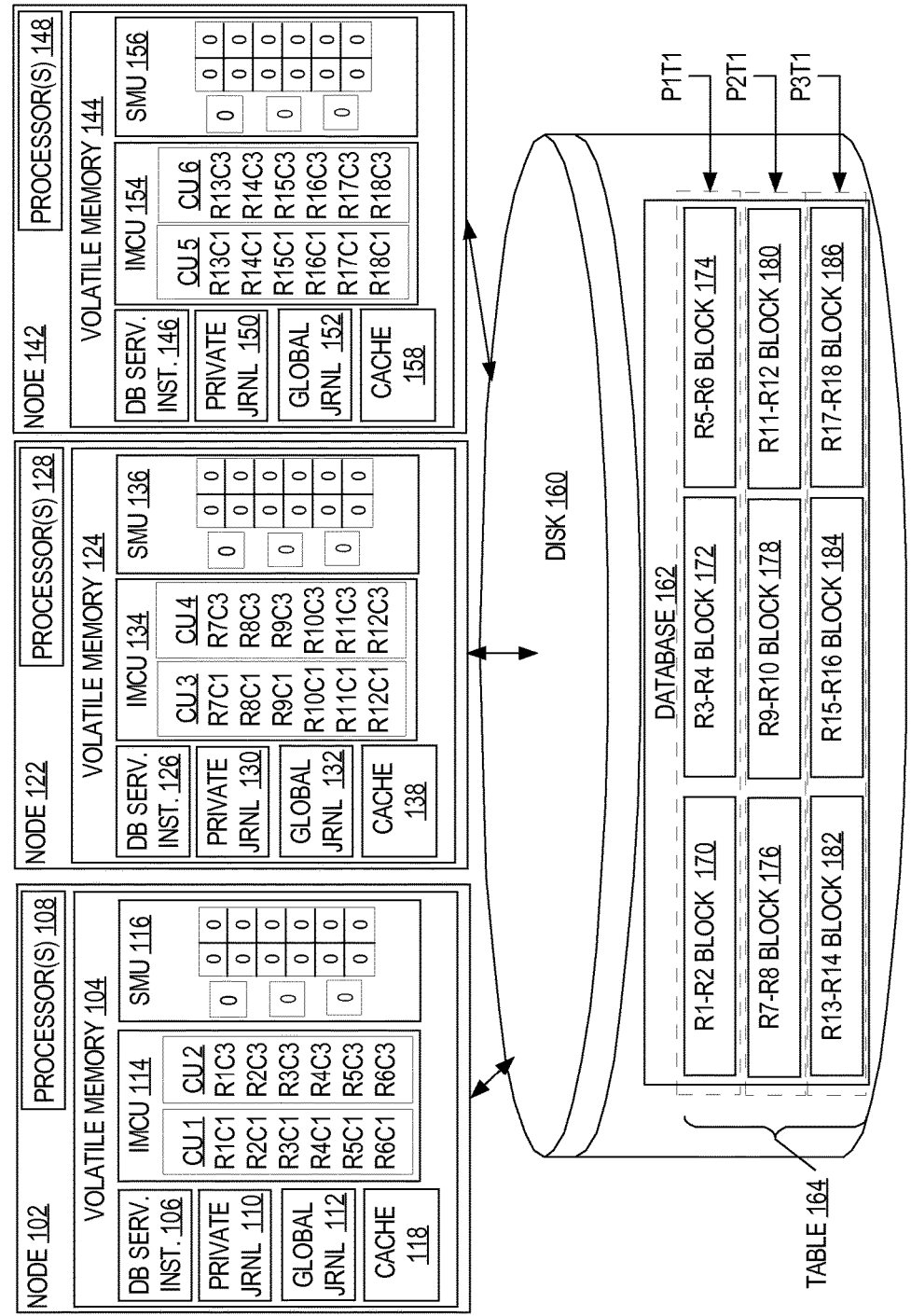
FIG. 1 is a block diagram of a database cluster.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for generating a cost-estimate for a join query that joins partitioned (or sub-partitioned) tables based on how the tables are populated in-memory. See, e.g., FIG. 8. The cost of performing a join against "mirror format" data (MF data) that is at least partially located in volatile memory is determined differently from the cost of performing a join against "persistent format" data (PF data). Mirror format data is a copy of persistent format data stored in a different format in volatile memory. In the preferred embodiment described herein, the mirror format data is stored in a column-major format, while the persistent format data is stored in a row-major format.

When a database server instance receives a join query, a specialized process known as the query optimizer considers a plurality of query execution plans that describe how the work of the query may be divided into tasks and assigned to different slave processes in the cluster. The tasks involve scanning the tables selected by the join query and performing a join operation on the scanned data. When at least one of the tables selected by the join query is partitioned and the join key is on the same key as a partition key of one of the tables, the query optimizer considers a partition-wise join query execution plan as a candidate among a multitude of possible methods for executing the join query. For fully in-memory partition-wise join query execution plans, the in-memory distribution of the tables allows for the data to be scanned and joined by slave processes without re-distributing data after performing the scanning operation on the in-memory data. When estimating the distribution cost, the optimizer skips the cost of transferring data to target nodes from such tables.

In a dual format database cluster, the data required for the join query may not be distributed for a fully in-memory partition-wise join prior to receiving the join query. Therefore, when considering a partition-wise join query execution plan, the query optimizer determines the amount of MF data that resides in the in-memory area of each local instance as well as the amount of data that has to be read from disk or buffer cache, and properly estimates the cost of a table scan operation comprising both in-memory and on-disk data.

The query optimizer also considers at least one execution plan for performing a join operation without using the partition-wise join technique. In such execution plans, more data required for the join query may be accessed from the in-memory areas residing on different instances, and the data is redistributed so each slave process may perform a join operation on a discrete set of data. In the optimizer estimate, a higher portion of the table is scanned from in-memory data compared to a partition-wise join that requires accessing some data from disk. However, the data from each table needs to be redistributed to the proper node to perform the join after the table scan. Therefore, the optimizer attributes a higher distribution cost to the execution plan.

The query optimizer then determines and selects a query execution plan with the lowest cost. The determination often depends on the trade-off between reading the maximum amount of data from memory and performing some inter-process communication to redistribute the data after an in-memory scan (i.e. not using a partition-wise join technique) versus reading some data from disk and performing a minimum amount of inter-process communication (i.e. using partition-wise join technique).

System Overview

Referring to FIG. 1, it is a block diagram that depicts a database cluster 100 according to one embodiment. In the embodiment illustrated in FIG. 1, three nodes 102, 122 and 142 have access to the same database 162. For the purpose of illustration, database 162 is shown as stored on a single shared disk 160, but in alternative embodiments may be spread across multiple disks to which each of nodes 102, 122 and 142 have access.

Nodes 102, 122 and 142 respectively have one or more processors 108, 128 and 148, and local volatile memory 104, 124 and 144. In addition, nodes 102, 122 and 142 are respectively executing database server instances 106, 126 and 146. While in the illustrated embodiment each node is executing a single database server instance, in alternative embodiments a single node may execute more than one database server instance.

Database 162 includes a table 164. Each of nodes 102, 122 and 142 is able to access data items from table 164 from the copy of table 164 that resides on disk 160. However, it is often much faster for any given database server instance to access data items of table 164 that are cached in the volatile memory that resides on the node in which the database server instance is executing (i.e. caches 118, 138, 158).

Table 164 is composed of nine disk blocks 170, 172, 174, 176, 178, 180, 182, 184, 186 organized into three partitions (P1T1, P2T1 and P3T1). According to one embodiment, if table 164 has been designated as "in-memory enabled", selected columns from blocks 170-186 from each partition P1T1, P2T1, P3T1 are divided into chunks and loaded together during the population of volatile memories 104, 124 and 144. Thus in the example in FIG. 1, all chunks from P1T1 are hosted by node 102; all chunks from P2T1 are hosted by node 122, and all chunks from P3T1 are hosted by node 142.

Dual-Format Database Overview

As described in detail in the Mirroring Application, within a dual-format database, data from a table can reside in both columnar format in an in-memory column store and in row-major format on disk. The in-memory columnar format speeds up analytic queries and the row-major format is well-suited for answering On-Line Transaction Processing (OLTP) queries.

It should be noted that scanning on-disk tables does not necessarily mean disk I/O. Some or all of the blocks of the table-to-be-scanned may be cached in volatile memory, in persistent format, in a buffer cache. Thus, within a dual-format database, it is possible for there to be at least three copies of the same item available: (a) a copy in persistent format on persistent storage, (b) a copy in persistent format in volatile memory (the buffer cache), and (c) a copy in mirror format in volatile memory.

The creation and storage of columnar data in the in volatile memories of the cluster is called population. Population is done from the persistent format row-major data (referred to as PF data herein). Specifically, the in-memory area is populated by reading items from table 164, which resides on disk 160, converting the items into mirror format, and storing the items in the in-memory area. In the illustrated embodiment, the mirror format data (referred to as MF data herein) is a columnar representation that includes contiguously allocated chunks called In-Memory Compression Units (IMCUs 114, 134, 154).

In the embodiment illustrated in FIG. 1, IMCUs 114, 134, 154 contain items extracted from a set of rows of table 164. Table 164 itself is stored on disk 160 as PF data. Within IMCUs 114, 134, 154 items from each column of table are stored separately and contiguously as column Compression Units (CU1, CU2, CU3, CU4, CU5, and CU6). Specifically, IMCU 114 includes CU1 and CU2; IMCU 134 includes CU3 and C4; and IMCU 154 includes CU5 and CU6. Each pair of CUs respectively contains items of table 164 from columns "C1" and "C3."

According to one embodiment, partitions and sub-partitions of a partitioned table are organized into IMCUs independently of each other, and an IMCU does not span multiple partitions. A single partition or sub-partition can, however, have multiple IMCUs. For the purpose of illustration, only one IMCU is presented in each node. However, an entire partition will often require a single node to host multiple IMCUs for that partition. The size of an IMCU may vary depending on the type of compression(s) used.

Each column may be compressed at different compression levels. For example, CU1 may be compressed at a compression level CL1, while CU2 is compressed at a compression level CL2. Further, different CUs of the same column to be compressed differently. For example, in IMCU 114, CU1 for a "row_id" column may be compressed at level CL1, but in a different IMCU 134, CU3 for the "row_id" column may be compressed at a different level CL2.

Different compression levels are suitable for different use cases. For example, compression techniques have been developed that are specifically optimized for DML performance. Other compression techniques are optimized for query performance. Yet other techniques are optimized for space capacity.

Journals and SMUS

Each database operation is tracked in a private journal (110, 130, or 150) as part of a transaction. A transaction is a sequence of database operations that are treated as a single unit. Using the private journal, a node may track transaction-specific changes to a table. The transaction is able to see all transaction-specific changes that are applied to the table, but no other transactions can see those changes until the transaction commits. For example if node 102 is tracking a transaction, private journal 110 is only accessible by node 102 until commit.

Once the transaction commits, the aggregate changes are pushed to a corresponding global journal. Global journals (112, 132, and 152) are sharded to correspond with in-memory data. Rather than updating an IMCU for every committed transaction that modifies an IMCU, the aggregate changes are stored in a corresponding global journal. Storing the data in an additional data structure avoids the overhead of decompressing and re-compressing the IMCU.

To ensure that each node is aware of the IMCU data that is no longer valid, each IMCU has a corresponding SMU (116, 136, 156) that provides a bitmap of which portions of the IMCU are invalid. In the example in FIG. 1, the first column of an SMU indicates whether a block in the corresponding IMCU is invalid. The second column indicates whether a row in the corresponding IMCU is invalid. The third column indicates whether additional transaction data corresponding to a row may be found in a corresponding journal.

Selective Population of the In-Memory Area

It is not necessary for an entire table to be populated in-memory. For example, it is possible that only 250,000 rows of a table are populated in-memory, even though the table may have 1,000,000 rows. This may be accomplished, for example, by partitioning the table by row ranges, and loading less than all of the partitions. Consequently, for partitioned tables, it is possible to enable some of the partitions for in-memory and leave others only on disk.

Figure 2:
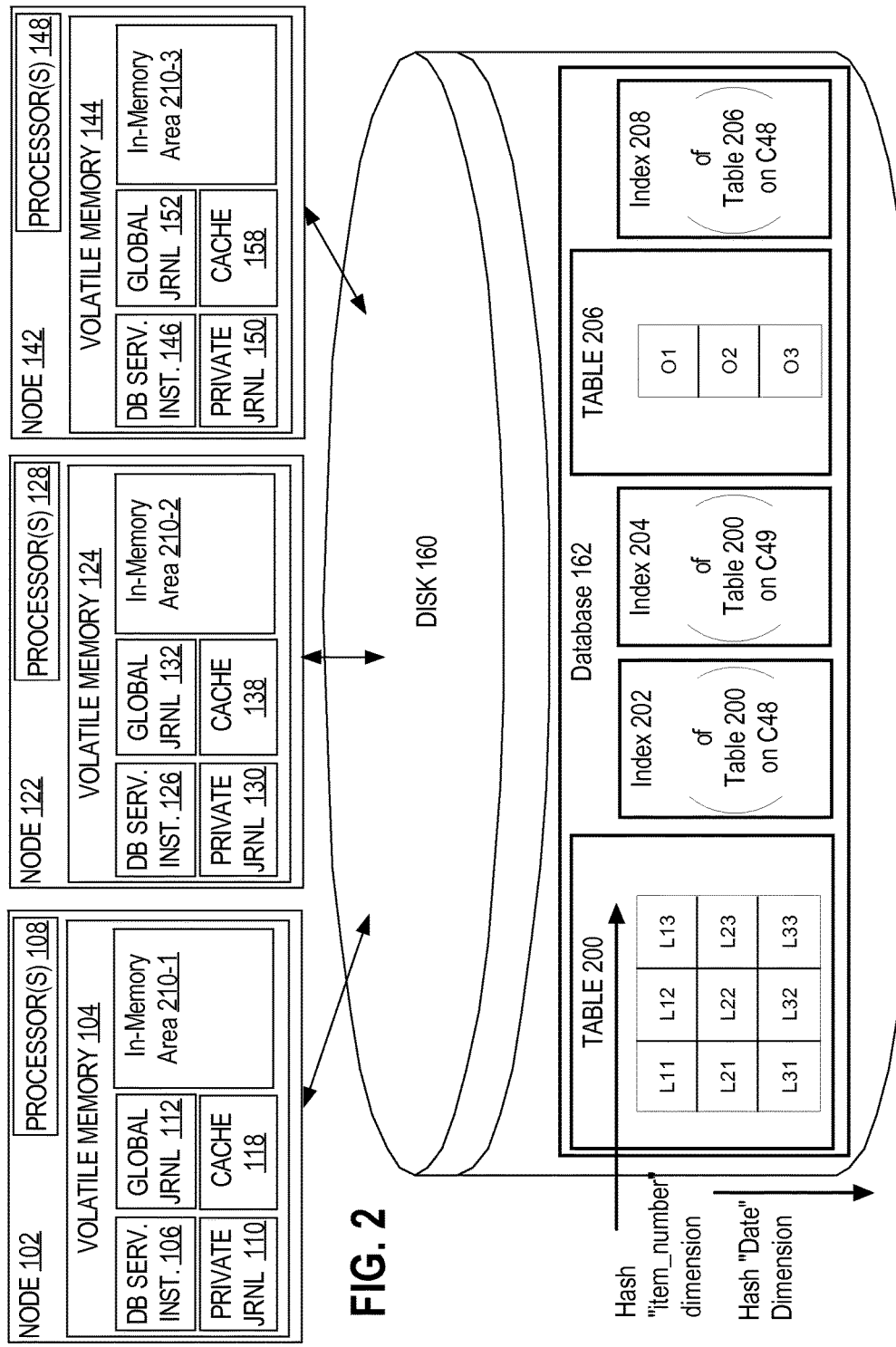
FIG. 2 is a block diagram of a database with two tables and at least one index for each table.

For example, in FIG. 2, in-memory area 210 is divided among three nodes 102, 122, and 142. Table 200 is partitioned into partitions ($L_{1i}$-$L_{3i}$) and sub-partitions ($L_{j1}$-$L_{j3}$). Partitions L11 and L21 could be loaded into in-memory area 210-1 as IMCUs; partitions L12 and L22 could be loaded into in-memory area 210-2, and partitions L13 and L23 could be loaded into in-memory area 210-3. In this example, Partitions L31, L32, and L33 would remain on disk in PF format without a corresponding MF copy in-volatile memory.

In addition, it is not necessary for all columns of a table to be populated. Thus, if memory is a constraint, users can decide what tables and columns to enable for in-memory. In the embodiment illustrated in FIG. 1, two columns (C1 and C3) of the table 164 have been loaded into IMCUs 114, 134, and 154, even though the table 164 has three columns (C1-C3).

Population Modes

Various techniques may be used to populate tables in volatile memory in a shared-disk cluster. For example, according to one embodiment, a shared-disk cluster supports a DUPLICATE mode and a DISTRIBUTE mode.

Under DUPLICATE mode, all the IMCUs are populated on at least two instances. This provides fault tolerance in case one of the instances goes down. The DUPLICATE ALL mode populates all the IMCUs on all instances; this provides full fault tolerance.

In one embodiment, the DISTRIBUTE mode has three options: distribution by PARTITION, by SUBPARTITION, or by ROWID RANGE. The DISTRIBUTE AUTO option lets the database server choose the distribution method.

The DISTRIBUTE mode provides a way to efficiently use the combined in-memory areas of all nodes and access the data using parallel queries on the in-memory tables. However, if the query is executed in serial on a single instance, there will be disk I/O since parts of the table will be populated in-memory on other nodes. Running in parallel but with insufficient processes will also result in disk I/O. Thus, even though a table may be fully populated in-memory in a shared-disk cluster, it is possible to incur disk I/O depending on the execution plan.

Join Query

One of the most basic operations performed against data in a database is the join operation. A join is used to combine multiple tables, so data from those tables may be selected in a query. A query that joins two tables specifies how the tables are joined using a "join key". For example, a query may specify that rows in a first table only join with rows in a second table when the rows in the first table have a value in a particular column that matches the value in a particular column of rows in the second table. The corresponding columns that contain the values that determine which rows of the first table join with which rows of the second table are referred to as the "join key."

In a database cluster, the work of combining data from multiple tables and evaluating the conditions used to join the tables may be distributed across multiple nodes. Each node works on a subset of data individually, and then relays the results to a single node for final output or set of processes for subsequent operations in the execution plan. For example, assume a query joins a first table with a second table. The first table has rows A, B, C, and the second table has rows D, E, F. To distribute the work required by this query, one node in the cluster compares a "join key" column of row A with the join key column of rows D, E, F; another node compares row B with rows D, E, F, and a third node compares row C with rows D, E, F. Once all of the possible combinations of rows are evaluated, a single node aggregates the results and responds to the query.

A join query is not necessarily limited to joining two tables. For example, a database may have a "fact table" object and multiple "dimension table" objects. The fact table has a large number of rows with multiple columns for each row, while the dimension tables may comprise only a few columns. The fact table and dimension tables are likely organized so one or more of their columns are similar. For example, one dimension table may have a DEPARTMENT column in common with the fact table, while another dimension table may have a DATES column in common with the fact table. Both the fact table and the dimension tables may be partitioned along one or more of these similar columns. A join query (sometimes referred to as a "star query") may join multiple dimension tables to the fact table.

Join Methods

Multiple join method choices are available to the query optimizer. Join methods include, but are not necessarily limited to, hash joins, merge-sort joins, and nested loop joins. A hash join involves hashing the table on the left side of the join by the join-key and building a table containing the hash values referred to as a build table. Each hash may be broadcast to all nodes or sent to a dedicated node. Then, the second table in the join query referred to as the probe table is scanned. A comparison of each data item from the join key of the probe table may be easily compared to the corresponding join key data items from the build table because the build table data items are organized in a hash table. The hash join is the most commonly used join method for parallel join processing, partition-wise joins, and partial partition-wise joins.

A merge-sort join involves sorting both tables in the join query and sending each sorted range to a corresponding node. Each node then compares the lowest value from the first table to the lowest value in the second in-memory table. After evaluating the join predicate, the lowest data item from one of the tables is incremented to the next data item, and the next lowest data item from the first table is then compared to the lowest data item from the second table, and so on. Merge joins are typically used when the join predicates contain non-equality conditions.

Finally, a nested loop join involves comparing each value from the join key of the first table to each value from the join key of the second table (via a nested loop). This evaluation method is usually useful when a table is indexed on the join key, and each node can relatively quickly scan the index. Indexes 202, 204, and 208 may be used for this purpose. However, due to space constraints or system designer constraints, indexes are often not distributed into volatile memory as MF data. Thus, the nested-loop join is often associated with PF data.

Parallel Query Execution

In some embodiments, a particular query may be received by a single node, but then the work of the query may be distributed to multiple nodes in a cluster according to a query execution plan. During the parallel execution of a query, every SQL operation in an execution plan is divided into tasks and assigned to different processes (slave processes). For example, the scan operation is parallelized by dividing the work of scanning a table into work granules that correspond to different portions of the table. Each work granule is assigned to different target slave processes (i.e. database server instances 106, 126, and 146). Data produced by a set of slave processes executing one operation are distributed to the next set of processes executing the next operation. The number of processes assigned to an SQL operation is called the degree of parallelism.

Partition-Wise Join

A partition-wise join (PWJ) significantly reduces the work required to perform a query that joins multiple tables. Before evaluating the conditions of a query that joins two tables, the joined tables are separated into sub-tables, referred to as partitions, based on the values of corresponding columns referred to as the "partition key." Each partition has rows containing a set or range of values depending on the partition scheme such as range partition, list partition, hash partition, etc. The same partition schemes could be used to further divide partitions into sub-partitions.

When a query joins the two tables based on the values from the join column, the work for the join query is distributed based on partition. Each node performs a smaller join on a partition from each table containing the same set or range values, rather than comparing every row in one table against every row in another table.

For example, assume that each of two tables is partitioned into three partitions, and that a column labeled "DATE" is the join key for each table. Under these circumstances, each of the three partitions corresponds to a range of dates. For example, the first table may be divided into three partitions T1P1, T1P2, T1P3 that correspond to date ranges 1/1/1980 to 12/31/1989, 1/1/1990 to 12/31/1999, and 1/1/2000 to 12/31/2009. The second table may be divided into three partitions T2P1, T2P2, T2P3 that correspond to the same three date ranges 1/1/1980 to 12/31/1989, 1/1/1990 to 12/31/1999, and 1/1/2000 to 12/31/2009. For the purpose of explanation, it shall be assumed that rows A, B and C have dates that fall into partitions T1P1, T1P2 and T1P3, respectively, and that rows D, E, and F have dates that fall into partitions T2P1, T2P2 and T2P3, respectively.

When the two tables are joined based on the DATE column, the work distributed to each node becomes significantly less. Specifically, after the partitioning, both row A and row D are part of the same date range; row B and row E are part of the same date range; and row C and row F are part of the same date range. Using a partition-wise join, one node performs a join between T1P1 and T2P1 (which only requires row A to be compared with row D). Another node performs a join between T1P2 and T2P2 (which only requires row B to be compared with row E). Finally, a third node performs a join between T1P3 and T2P3 (which only requires row C to be compared with row F). Then the results are aggregated. Compared to the previous example, each node performs a third of the work in order to provide a result.

Partial Partition-Wise Join

The technique, referred to herein as a partial parallel partition-wise join, involves dynamically partitioning the second table using the same partitioning key and criteria as was used to create the pre-existing static partitions of the first table. After the second table has been dynamically partitioned, the data from each partition of the first table is sent to a slave process along with the data from the corresponding dynamically created partition of the second table.

Referring to FIG. 2, database 162 contains two tables. Table 200 is referred to as a "lineitem" table and table 206 is referred to as an "orders" table. The lineitem table 200 may represent products by department with columns for "product_id" (table200.C1), "department_number" (table200.C2), and "retail_value" (table200.C3). The orders table 206 may represent sales data for the year with columns for "date-of-sale" (table206.C1), "product_id" (table206.C2), and "sale_price" (table206.C3).

Table 200 is hash partitioned on a "product_id" column ($L_{1i}$-$L_{3i}$) and sub-partitioned on a "retail_value" column ($L_{j1}$-$L_{j3}$). Table 206 is only partitioned on a "product_id" column ($O_1$-$O_3$), but has a "sale_price" column that could correspond to the "retail_value" column of table 200 because they have the same type of data items stored in the corresponding columns. Assume a node in cluster 100 receives a join query with a join key on the "retail_value" column of table 200 and the "sale_price" column of 206.

SELECT*FROM table200, table206 WHERE table200.C3=table206.C3;

A full partition-wise join cannot be performed in response to a statement that joins lineitem table200.C3 with order table206.C3 because the order table 206 is not partitioned based on "sale_price" even though lineitem table 200 is partitioned base on "retail_value." However, the overhead associated with the join operation may still be reduced by performing a partial partition-wise join.

A partial partition-wise join is performed by dynamically partitioning order table 206 using the same partition key and criteria that was used to partition the lineitem table 200 on the join key. Since partition table 200 is partitioned into three partitions based on "retail_value", the same three-way partition criteria used to sub-partition the lineitem table 200 is applied to the "sale_price" values of the rows in the order table 206 to dynamically organize the rows of order table into three hash buckets. The new partitions from table 206 are then loaded into nodes 102, 122, 142 along with the corresponding partitions from table 200.

Frequently, the slave process that is responsible for determining the hash bucket for a particular row is on a different node than the slave process that is responsible for joining rows from that hash bucket. Consequently, the transmission of the row from one slave to the other often involves inter-node communication, which has a significant impact on performance. Thus, a significant benefit achieved by partial parallel partition-wise joins is that data from only one of the two objects involved in the join is dynamically partitioned, and therefore may require inter-node transmission. Rows from the statically partitioned object, on the other hand, may simply be accessed from disk or accessed directly from the local volatile memory of node on which resides the slave process responsible for processing the partition in which the rows reside. The larger the statically-partitioned object, the greater the performance gain achieved by avoiding the inter-node transmission of data from the statically-partitioned object.

In-Memory Scan Overview

An in-memory scan refers to the operation of obtaining at least some of the data items that satisfy a query from MF data, rather than the PF data on-disk or cached copies of the PF data stored in buffer caches 118, 138, 158.

According to one embodiment, an in-memory scan starts by locating the IMCUs that contain the required rows. Within each IMCU, it is typically only necessary to look at the CUs of the columns referenced in the query. According to one embodiment, all necessary columns must be in-memory-enabled to use an in-memory scan. For example, in such an embodiment, the query "SELECT C1, C3 FROM Table164 WHERE C3>100" may be satisfied by an in-memory scan of IMCU 114, while the query "C1, C2, C3 FROM Table164 where C3>100" would not (because "C2" is not one of the columns for which IMCU 114 has a CU).

According to another embodiment, when some data is only available on-disk, the query optimizer may consider a hybrid query execution plan. For example, given the above query, the query execution plan may be divided into a branch that evaluates the in-memory portion of the table and another branch that evaluates the on-disk portion, and then aggregate the results.

According to one embodiment, each CU has an in-memory storage index that contains the minimum and maximum column values for all rows in that CU. The storage index is used to prune CUs using predicates on the column. Even if a CU is not pruned, certain predicates are much more efficiently evaluated on compressed data instead of the SQL execution engine. Thus, in some embodiments, the database server pushes down many types of predicates to the in-memory scan.

When rows are deleted from a table that contains the PF data, the corresponding entries in the IMCUs for these rows are marked as invalid. When new rows are inserted into an in-memory table, they are first stored in a corresponding global journal (112, 132, or 152) until they reach a certain threshold, after which the IMCUs are rebuilt. Thus, when scanning an in-memory table, invalid rows from the CUs are skipped and additional rows in the transaction journal are scanned. Transactional consistency is maintained in all cases.

Query Optimizer

Each database server instance 106, 126, 146 contains a query optimizer, so any node 102, 122, 142 in the cluster 100 may receive a query and determine an optimized query execution plan. The optimizer is usually comprised of various components. The estimator component computes predicate selectivities (which help determine the resulting cardinalities of scans, joins, and aggregations) and estimates the costs of various database operations including access paths, join methods, aggregations, communication between parallel processes, and many more. A cost-based query transformation component works in conjunction with the estimator to enumerate and compare semantically equivalent forms of the query.

The query optimizer determines whether to perform transformations on the given query and tries to pick the optimal access method, join method, join order, data distribution method, and other database operation methods for the given query. Some of these techniques perform better on disk than in-memory and vice versa due to on-disk specific costs and in-memory specific costs described herein based on the specific query. For these reasons, it is essential for the query optimizer to consider the cost of each technique both on-disk and in-memory.

For example, a table partitioned into two partitions does not easily distribute to three clustered computers. It may be faster to perform the work of the join in parallel across the three computers rather than perform a partition-wise join on only two computers. Distributing data in this manner is referred to as a non-PWJ approach. Thus, in this example, the query optimizer may choose between two methods for executing a join operation: (1) distributing the data for a partition-wise join/partial partition-wise join that can be processed by the same set of processes or (2) scan and join the data using different sets of processes where the output of the scan process are distributed to the join processes in a producer-consumer operation, henceforth referred to as producer-consumer join execution. To decide which method is faster, the query optimizer performs a cost analysis on both forms of the data distribution.

In-Memory Statistics

A query optimizer needs accurate statistics to generate accurate cost estimates. Thus, an optimizer that is to account for the existence and availability of MF data needs accurate statistics relating to the MF data. According to one embodiment, the database server maintains both object statistics and system statistics relating to the MF data.

Object statistics refer to statistics that correspond to a particular database object, such as a database table, partition, index, etc. Object statistics on tables can be categorized as logical or physical. Logical statistics are a function only of the data, not the table's storage format. Such logical statistics may include, among other things:

the number of rows,
average row length,
column histograms, and column minimum and maximum values and number of distinct values Auxiliary structures like indexes also have logical statistics like number of distinct index keys.

Physical statistics of tables are a function of the data, their storage representation and database settings. For row-major on-disk tables, physical statistics may include, among others:

the number of blocks, and
the number of chained rows

System statistics, on the other hand, relate to the environment in which the query is being executed. For example, system statistics may include, among others:

the number of CPUs,
CPU speed,
I/O throughput,
number of nodes in the cluster, and
available memory For in-memory tables, logical object statistics are still necessary since they are used to estimate cardinalities which are independent of the physical storage representation of the data. Physical object statistics, however, depend on the actual data storage format. Since cluster 100 has tables copied in-memory as MF data, new physical object statistics are needed for such tables.

For partitioned tables, in-memory statistics, like other table statistics, are maintained at the partition level. Table-level in-memory statistics are derived by aggregating partition-level statistics.

The in-memory statistics are gathered along with corresponding on-disk statistics. In some embodiments, consistency is maintained between in-memory statistics and on-disk statistics. Techniques for maintaining consistency include capping and prorating. Capping applies the constraint that in-memory copies of data are a subset of on-disk data. For example, the number of in-memory blocks should never be greater than the number of on-disk blocks. Thus, the in-memory blocks may be capped at the number of on-disk blocks to keep the statistics in-sync. Prorating applies the constraint that subsets of data should have statistics that correspond to smaller groups of the larger set. For example, if the query optimizer gathers on-disk statistics without gathering statistics for on-disk partitions, statistics on the partitioned data may be extrapolated as subsets of the on-disk statistics. Other techniques such as capping may then be applied to the prorated statistics. The pro-rating technique is particularly effective when a table is sub-partitioned, and statistics are not gathered for every sub-partition. Consistency ensures that the estimations using the different statistics are at least relatively accurate.

In some embodiments, the in-memory statistics are stored on disk to facilitate reuse between queries as well as synchronize statistics between different database server instances.

Optimizer Use of In-Memory Statistics

The optimizer uses logical object statistics primarily to estimate cardinalities of various operations like table and index scan, join, and GROUP BY. The estimated cardinalities, along with physical object statistics and system statistics are used to estimate costs for these operations.

Accurate costs are necessary to choosing the best plan from among several alternatives; this means that complete and up-to-date statistics are a must for the optimizer. For in-memory tables, the same logical object statistics for disk-based tables are still valid since they are used to estimate cardinalities which are independent of the physical storage representation of the data. Physical object statistics, however, depend on the actual data storage format. Since a dual format database system allows tables to be declared in-memory, new physical object statistics are needed for such tables. According to one embodiment, indexes cannot be declared in-memory, and thus no new costs are needed for them.

The in-memory statistics are applied to specific costs associated with in-memory scans. In some embodiments this may include applying an in-memory quotient as a coefficient to a function that incorporates a series of known costs. These costs include storage index pruning cost, decompression costs, predicate evaluation costs (during the scan), row stitching costs, and transaction journal scan costs.

Storage Index Pruning Cost:

The optimizer estimates how many IMCUs must be scanned after the in-memory storage index prunes non-matching IMCUs. This is computed by applying the table filter predicates on the minimum and maximum values of the corresponding column CU. Consider the predicate c1<10. Suppose the minimum value of one of the column's CU is 15. Then we can safely prune away that CU for scanning since none of its rows will satisfy the predicate. The optimizer determines this for every CU of the column. If there are predicates on multiple columns, say c1<10 AND c2>5, the pruning is computed for each column. Because these predicates are AND-ed, the optimizer can prune an IMCU if any single predicate prunes its column's CU.

Because storage index pruning requires scanning every IMCU header, the optimizer includes this in its cost for the table scan. There are several other operations that are performed during the scan. These operations are described below. Note that the costs for these operations are included only for the IMCUs remaining after storage index pruning. In the corner case where all IMCUs are pruned, none of the following costs will apply.

Decompression Cost:

At run-time, column CUs must be decompressed to retrieve the corresponding values. This must be done for all referenced columns for the table. The decompression cost of a CU is a function of the compression method used for that CU. Different CUs, even for the same column, may be compressed differently.

Predicate Evaluation Cost:

Predicate evaluation on in-memory tables takes place during the scan. For example, the predicate c1<10 may be evaluated on encoded column values while the CUs for c1 are being scanned. In addition, the evaluation can be done on multiple rows using vector operations on a SIMD system. If there are multiple AND-ed predicates like c1<10 AND c2>5, any IMCU that is eliminated because of an earlier predicate is skipped for subsequent predicates.

Row Stitching Cost:

This includes stitching all projected columns into rows for the subsequent operation, like a join, in the plan.

Transaction Journal Scan Cost:

The in-memory transaction journals (global journals 112, 132, 152 and private journals 110, 130, 150) contain rows that were inserted or updated by DML statements but that have not yet been populated in IMCUs. These rows are in row major format and must be scanned in addition to the data in the IMCUs.

Selectivity

Selectivity of a predicate refers the percentage of rows returned based on the number of rows input. Selectivity is highly correlated to the cardinality of a column used in the predicate, the number of records in that column and the number of distinct values in the column.

A system that executes a join query typically returns less rows than the number of rows contained in either of the parent tables. A query that is likely to return very few rows despite a large input is referred to as having a low selectivity. The data in a particular column may be highly dispersed (e.g. one value per row) or highly dense (e.g. many repetitions of the same value). Selectivity may be estimated by comparing the columns of the predicates of the join query to the density of data in those columns.

Inflection Point

Based on the selectivity of a predicate, a nested join (using an index) may be a faster execution plan than a sort merge join or a hash join (which involve full table scans in order to build new tables). The selectivity at which one method becomes faster than the other method is referred to as the inflection point. The inflection point between hash join and nested loop joins are different between MF data and PF data because full table scans on MF data are faster.

Sort merge joins are generally useful when hash joins are not valid (non-equality joins for example) and nested loops are too expensive because of lack of indexes, the large cardinalities of the tables involved, or an unselective join predicate. Here, too, the inflection point between join methods might differ between MF data and PF data because scans are faster on MF data and sort keys are smaller in IMCUs since they are encoded.

Serial Optimization Pass for a Join Query

The query optimizer first prunes any partitions for table scans based on the predicate. Based on the logical object statistics, the query optimizer then performs a cost analysis of three types of join methods: hash join, sort-merge join, and nested-loop join. The cost model runs based on all of the previously mentioned statistics for each storage format of data. The on-disk data, with an on-disk index can have a different join method than the in-memory data. For example, the query optimizer is likely to select a nested-loop join using index 202 for selectivities of up to 20%. However, the query optimizer is likely to select a full table in-memory scan for the in-memory MF data, unless the selectivity is below around 1%. For joins on more than two tables, the above process is integrated in the join order selection.

Parallelizing the In-Memory Query

In some embodiments, the query optimizer may be configured to create a parallel query execution plan. The process is a two-step process. In the first step (called the serial optimization pass), the query optimizer estimates the query execution time in serial mode and the optimal degree of parallelism for every operation in the execution plan. The estimated time is compared to a time threshold—if the estimated time is less than the threshold, then the query is executed in serial mode. Otherwise the query optimizer performs the second step (called parallel optimization pass). For the below examples, assume that after combining the cost of the in-memory scan, with the cost of the on-disk scan, the cost is found to be above the threshold, so the joins are performed in parallel across three nodes.

The optimizer derives the maximum degree of parallelism from all the operations required to execute the query (computed in the serial optimization pass) and re-optimizes the statement using that degree of parallelism. The degree of parallelization and distribution methods for in-memory query will be different compared to disk queries due to the difference in in-memory costing.

If the serial execution plan cost is greater than the parallel execution plan cost (including the overhead of managing multiple nodes), then the optimizer generates a parallel execution plan using the computed degree of parallelism. Otherwise, the query optimizer selects the serial execution plan. The overhead of managing multiple nodes may be computed by multiplying the degree of parallelism times a scalability-factor. The scalability factor (a value between 1 and 0) accounts for the additional overhead of using parallel execution (such as creating and assigning processes, and cross-node communication).

Example In-Memory Partition-Wise Join Execution Plan

In some cases, both tables from a join query have already been partitioned, and distributed into the in-memory area on a distribution key that is the same as the partition key. In the case where, some or all of the partitions are already loaded into volatile memory, the overhead cost associated with disk I/O may be effectively eliminated and replaced with a much smaller cost of accessing MF data only in-memory.

Figure 3:
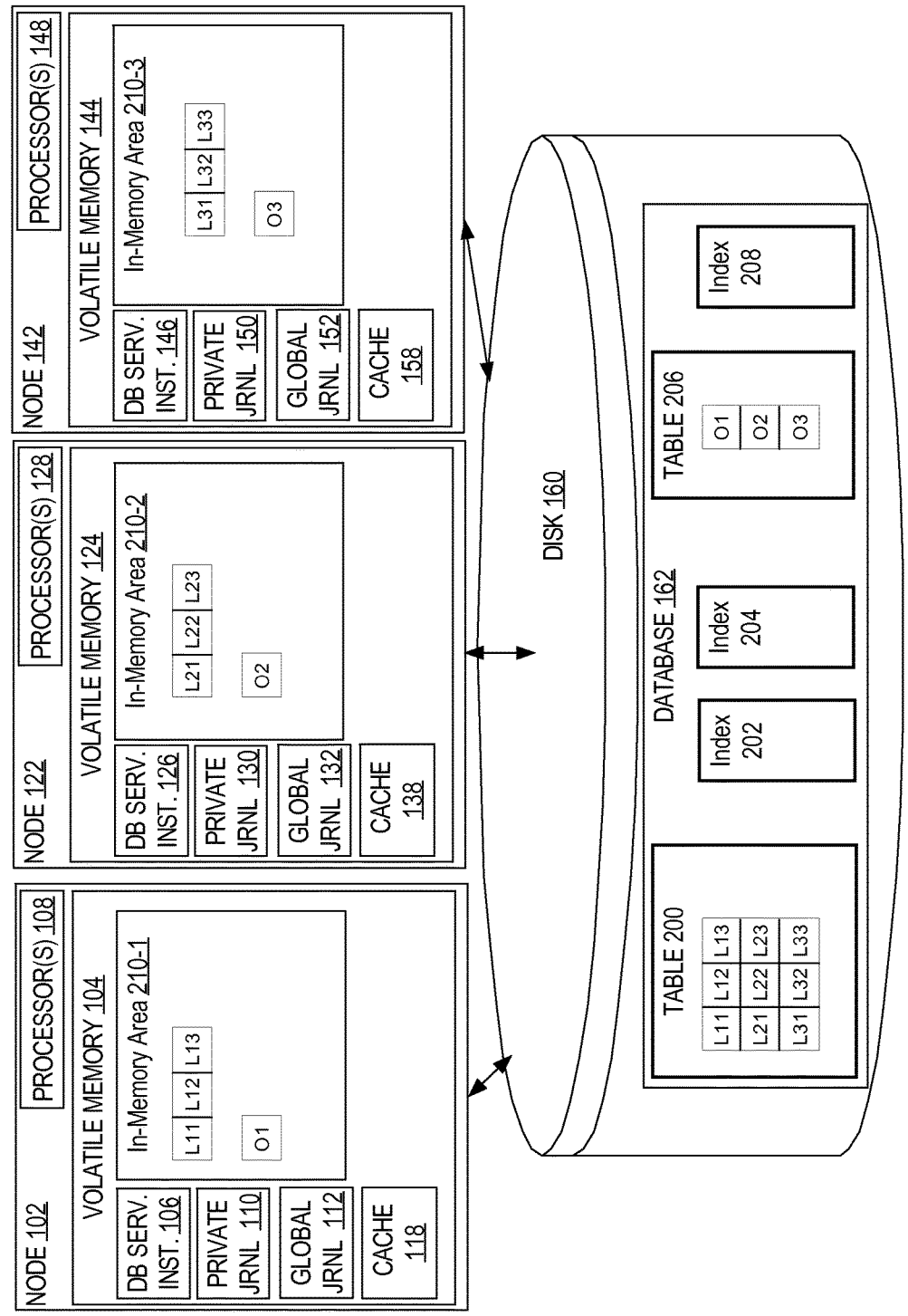
FIG. 3 is a block diagram of two tables distributed across the volatile memories of the database cluster, and the database cluster has the ability to perform a fully in-memory partition-wise join.

Referring to FIG. 3, in a distributed cluster, database objects (i.e. table 200, table 206, and indexes 202, 204, 208) may be located on a shared disk and some or all of that data may be copied in volatile memory. In this example table 200 and table 206 are fully enabled in-memory, while indexes 202, 204, and 208 are only stored on disk.

The lineitem table 200 may represent products by department with columns for "product_id" (table200.C1), "department_number" (table200.C2), and "retail_value" (table200.C3). The orders table 206 may represent sales data for the year with columns for "date-of-sale" (table206.C1), "product_id" (table206.C2), and "sale_price" (table206.C3).

Table 200 is hash partitioned on a "product_id" column ($L_{1i}$-$L_{3i}$) and sub-partitioned on a "retail_value" column ($L_{j1}$-$L_{j3}$). Table 206 is only partitioned on a "product_id" column ($O_1$-$O_3$), but has a "sale_price" column that could correspond to the "retail_value" column of table 200 because they have the same type of data items stored in the corresponding columns. Table 200 is distributed in memory by partition with a distribution key of "product_id", and table 206 is distributed in memory by partition with a distribution key of "product_id".

If a manager wants to review sales by department, a query to a sales database 162 may be received as follows:

SELECT*FROM table200, table206 WHERE table200.C1=table206.C2;

The query optimizer takes into account object statistics, system statistics, and database settings when evaluating alternative execution plans. The estimator component of the optimizer computes predicate selectivities and estimates the costs of the multiple data access paths and join methods. The cost-based query transformation component works in conjunction with the estimator to enumerate and compare semantically equivalent forms of the query. The cost model of an optimizer includes I/O, CPU, and network communication costs. Scans of on-disk row-major tables have different I/O and CPU costs than in-memory columnar tables.

The scanning of each table is allocated according to the population key, and the work of join is allocated according to the join key and the partition key. When the join key is the same as the partition key, partition wise join is a viable option. In the best-case scenario, two tables 200 and 206 in database 162 are joined on "join key" that is the same as the "partition key" of the table and then distributed in volatile memory according to the same "population key". When all three keys are the same, data from the scan does not need to be send to another node for the join, avoiding inter-node communications.

In FIG. 3, the cluster may perform an extremely cost efficient in-memory partition-wise join. Each node performs both the scanning operation and the join operation on the in-memory partitions without requiring access to data from tables 200 and 206 from other nodes in the cluster or disk. The optimizer first decides the execution plan, then parallelize the execution plan, which, in this example, generates an execution plan containing a partition-wise join. The query optimizer takes into account the partition-node co-location of the in-memory data necessary to execute the join query and generates work granules for a partition-wise join query execution plan:

Node 102 scans data from Partitions L11, L12, L13 and O1, and performs the join operation against data from only these partitions;

Node 122 scans data from Partitions L21, L22, L23 and O2, and performs the join operation against data from only these partitions; and Node 102 scans data from Partitions L31, L32, L33 and O3, and performs the join operation against data from only these partitions.

Comparing PWJ-Execution Plans with Non-PWJ Execution Plans

Even though one or both tables from a join query may have already been partitioned, and distributed into the in-memory area on a distribution key that is the same as the partition key, the population key and the join key may not be the same key. For a PWJ (partition-wise joins and partial partition-wise joins) execution plan, each database instance may access data from disk. However, in the case where, some or all of the partitions are already loaded into volatile memory, the overhead cost associated with disk I/O may be effectively eliminated and replaced with a much smaller cost of accessing MF data in-memory.

Figure 4:
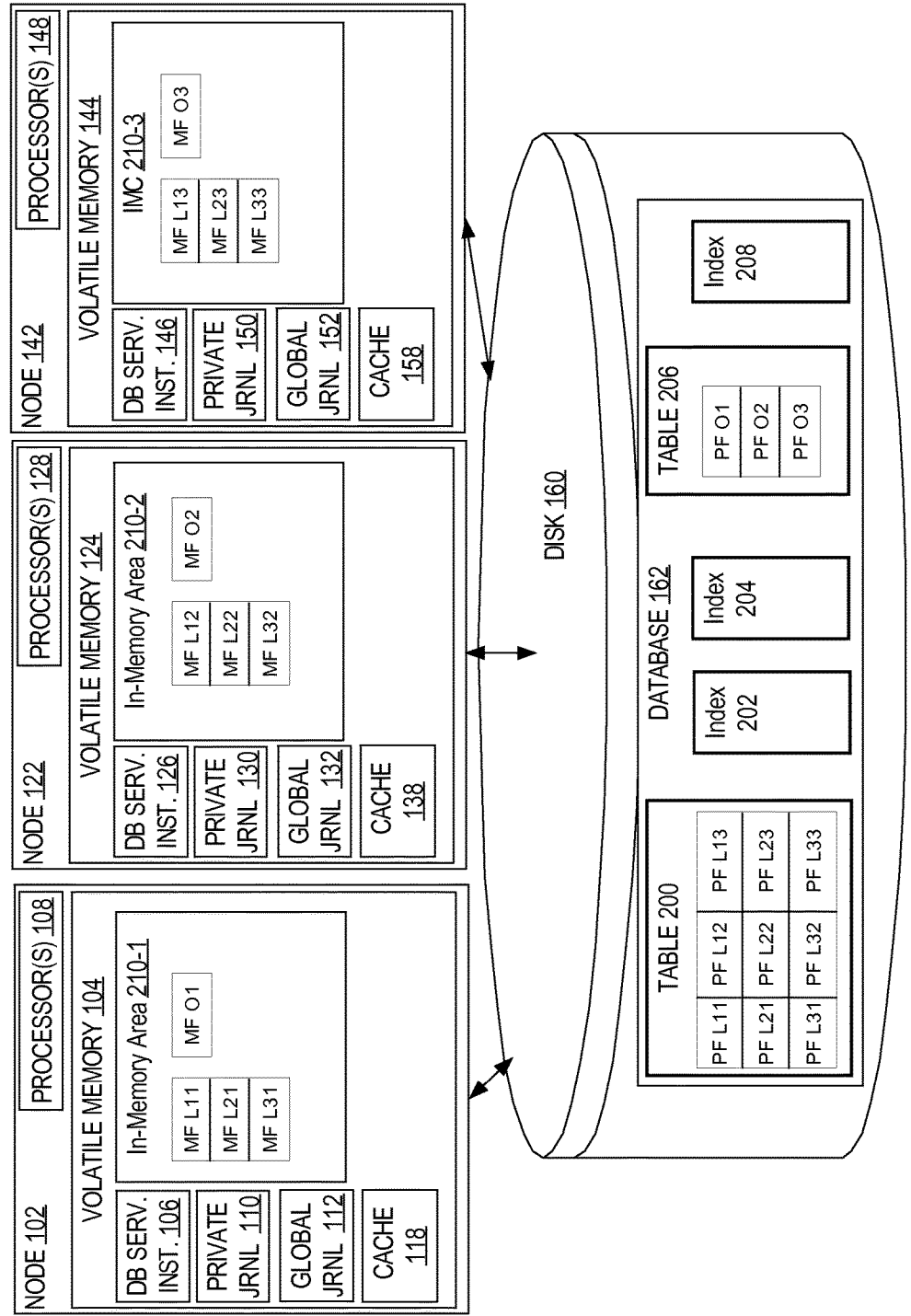
FIG. 4 is a block diagram of two tables distributed across the volatile memories of the database cluster, and the database cluster does not have the ability to perform a fully in-memory partition-wise join.

Referring to FIG. 4, consider the same join query as before but with a different in-memory data distribution.

SELECT*FROM table200, table206 WHERE table200.C1=table206.C2;

Table 200 is hash partitioned on a "product_id" column ($L_{1i}$-$L_{3i}$) and sub-partitioned on a "retail_value" column ($L_{j1}$-$L_{j3}$). Table 206 is only partitioned on a "product_id" column ($O_1$-$O_3$), but has a "sale_price" column that could correspond to the "retail_value" column of table 200 because they have the same type of data items stored in the corresponding columns. The join key in the above query is on the product_id key but the distribution key of table 200 is on the "retail_value" key.

The query optimizer takes into account object statistics, system statistics, and database settings when evaluating alternative execution plans. The estimator component of the optimizer computes predicate selectivities and estimates the costs of the multiple data access paths and join methods. The cost-based query transformation component works in conjunction with the estimator to enumerate and compare semantically equivalent forms of the query.

In this case, the semantically equivalent forms are a partially in-memory PWJ execution plan and a non-PWJ execution plan. The data access and data re-distribution for each method is different, but the join method (hash join) is the same.

Estimating Cost of Partially In-Memory PWJ Execution Plan

Figure 5:
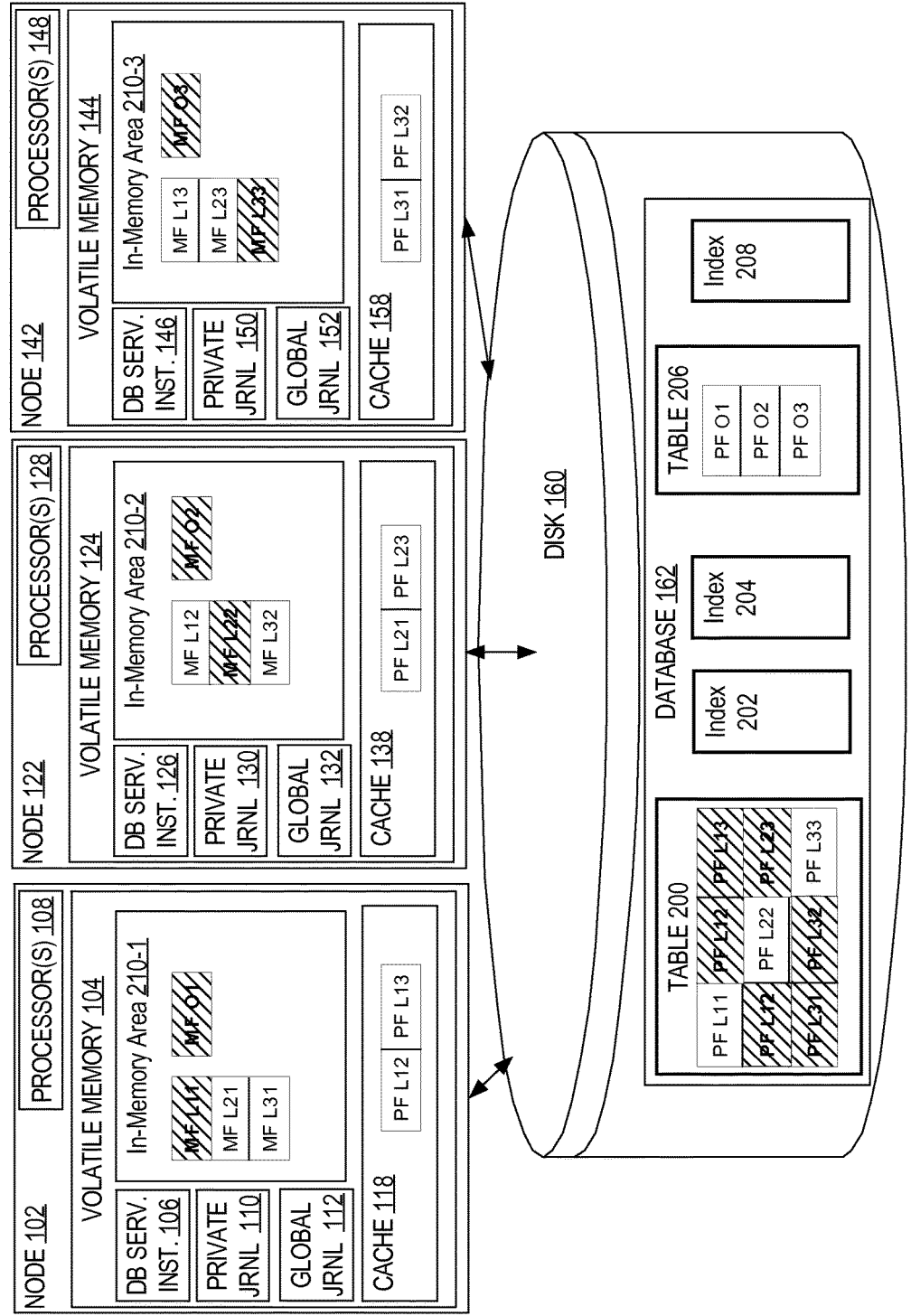
FIG. 5 is a block diagram of two tables distributed across the volatile memories of the database cluster illustrating how data would be scanned in a partially in-memory partition-wise join query execution plan.

In FIG. 5, the in-memory partitions are shaded to emphasize the cost of executing partition-wise join partially in-memory. In this execution plan, each node performs a portion of the scanning operation on in-memory MF data, and another portion of the scanning operation is performed on PF data. Each node may then perform the join operation data without requiring access to data from tables 200 and 206 from other nodes in the cluster. In FIG. 5, the PF data is maintained in buffer caches 118, 138, and 158 after the data is accessed from disk. However, even if the PF data was already loaded into buffer caches 118, 138, and 158, the cost of scanning in-memory PF data could be significantly more than the cost of scanning in-memory MF data.

For node 102, although L11 and O1 may be scanned in memory, a full partition-wise join requires reading L12 and L13 from disk before performing the join operation on these partitions;

For node 122, although L22 and O2 may be scanned in memory, a full partition-wise join requires reading L21 and L23 from disk before performing the join operation on these partitions; and For node 142, although L33 and O3 may be scanned in memory, a full partition-wise join requires reading L31 and L32 from disk before performing the join operation on these partitions.

The in-memory scan cost is computed as described above using the in-memory statistics. The on-disk scan cost is computed using the standard cost model for row-major tables but with prorated statistics of $B(1-q)$ blocks and $N(1-q)$ rows where q is the in-memory quotient defined as the ratio of in-memory data to total data. This cost will include both I/O and CPU costs. These costs are then combined to get the total table scan cost.

The cost of database server instance 104 scanning the first partition of lineitem (L11 . . . L13) is ⅓ MF based costs and ⅔ PF based costs. Only L11 is located in local volatile memory in MF format.

The cost of database server instance 124 scanning the first partition of lineitem (L21 . . . L23) is ⅓ MF based costs and ⅔ PF based costs. Only L22 is located in local volatile memory in MF format.

The cost of database server instance 144 scanning the first partition of lineitem (L31 . . . L33) is ⅓ in-memory based costs and ⅔ PF based costs. Only L33 is located in local volatile memory in MF format.

The cost of performing a partition-wise join on the in-memory data corresponds to the cost of a partition-wise join on a single node except in this case it takes ⅓ of the time because the above costs are performed in parallel. Additionally, the overhead cost of coordinating an in-parallel query execution plan is added (by multiplying the degree of plurality (3) times the scalability factor).

Estimating Cost of In-Memory Non-PWJ Execution Plan

Figure 6:
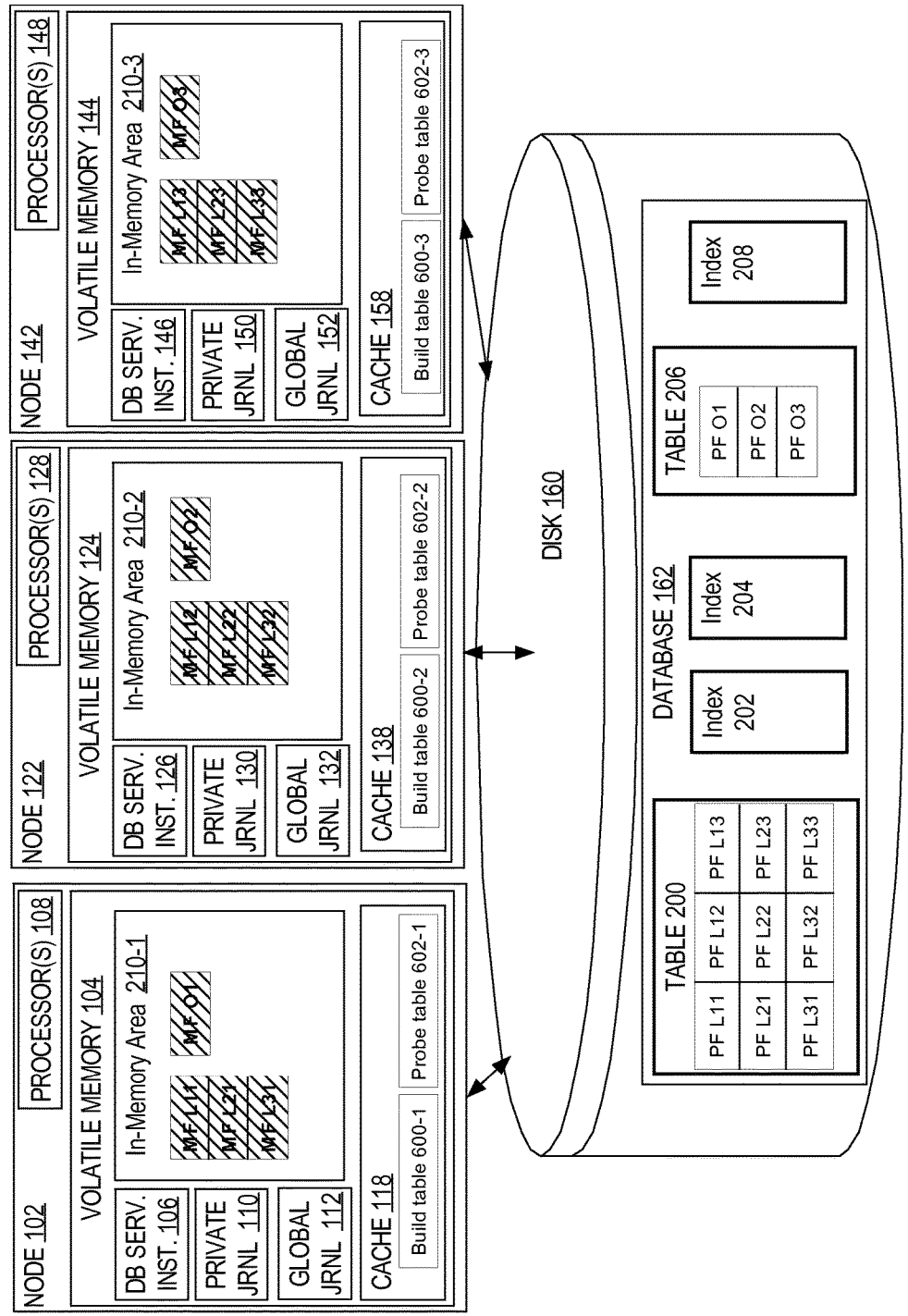
FIG. 6 is a block diagram of two tables distributed across the volatile memories of the database cluster illustrating how data would be scanned in a non-partition-wise join query execution plan.

In the non-partition-wise join query execution plan, each node performs the scanning operation on in-memory MF data. Each node then sends particular portions of data to an assigned target node based on the join key to perform the join operation. In FIG. 6, the in-memory partitions are shaded to emphasize how the data is accessed using an in-memory scan For node 102, L11, L21, L31 and O1 may be scanned in memory and then particular rows are transferred to assigned target nodes based on the join key;

For node 122, L21, L22, L32 and O2 may be scanned in memory and then particular rows are transferred to assigned target nodes based on the join key; and For node 142, L31, L32, L33 and O3 may be scanned in memory and then particular rows are transferred to assigned target nodes based on the join key;

The in-memory scan cost is computed by adding the storage index pruning cost, the decompression cost, the predicate evaluation cost, the row stitching cost, and the transaction journal scan cost using the in-memory statistics.

Even though the data is accessed completely in volatile memory, the slave processes performing the scanning operation must send the scanned data to a different set of slave processes to perform the join operation. In FIG. 6 the distributed build table (600-1, 600-2, 600-3) and distributed probe table (602-1, 602-2, 602-3) are maintained in buffer caches 118, 138, and 158 to help visualize how the MF data is transferred around the cluster. When the join operation for a piece of data is located on a different node than the node that performed the scan, additional overhead needs to be incurred for sending the data over the interconnect. The cost of transferring data over the interconnect is computed using system statistics and the amount of data to send.

The cost of performing a join on the in-memory data corresponds to the cost of performing the selected join method on a single node except in this case it takes ⅓ of the time because the above costs are performed in parallel. Additionally, the overhead cost of coordinating an in-parallel query execution plan is added (by multiplying the degree of plurality (3) times the scalability factor).

Selecting a Query Execution Plan Based on the Cost Model

After deriving the cost of different join execution strategies, the query optimizer then selects the query execution plan with the most efficient cost. In many cases, the lowest cost query execution plan involves accessing as much in-memory data as possible, but the decision usually depends on the tradeoff between accessing data from memory and doing inter-process communication (not using a partition-wise join) vs. reading the data from disk and not doing inter-process communication (using a partition-wise join). Of course, if a fully in-memory partition-wise join is available, that plan is always selected as the most cost efficient plan.

Whether the partition-wise join being considered is a full PWJ or a partial PWJ, the tables which are being scanned according to the partition key might incur additional disk I/O if it is not distributed by the same key. This could happen to both tables in full PWJ, or the partitioning table in partial PWJ. On the other hand, the tables which are not being scanned according to the partition key might incur additional distribution cost during the subsequent join operation, when the partitioning key for the join operation is not the same as the population key, or if the work for the join is not divided based on partitioning schemes at all (such as hash distribution or broadcast distribution methods).

When comparing the partially in-memory PWJ query execution plan of FIG. 5 with the non-PWJ query execution plan of FIG. 6, the query optimizer is likely to select the non-PWJ query execution plan. Accessing data in-memory is typically faster than accessing data on disk, and, in this particular example, the query may be performed against data that is entirely in-memory. The cost of transferring some data over the interconnect would likely be much less than the cost of accessing a large portion of data from disk.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
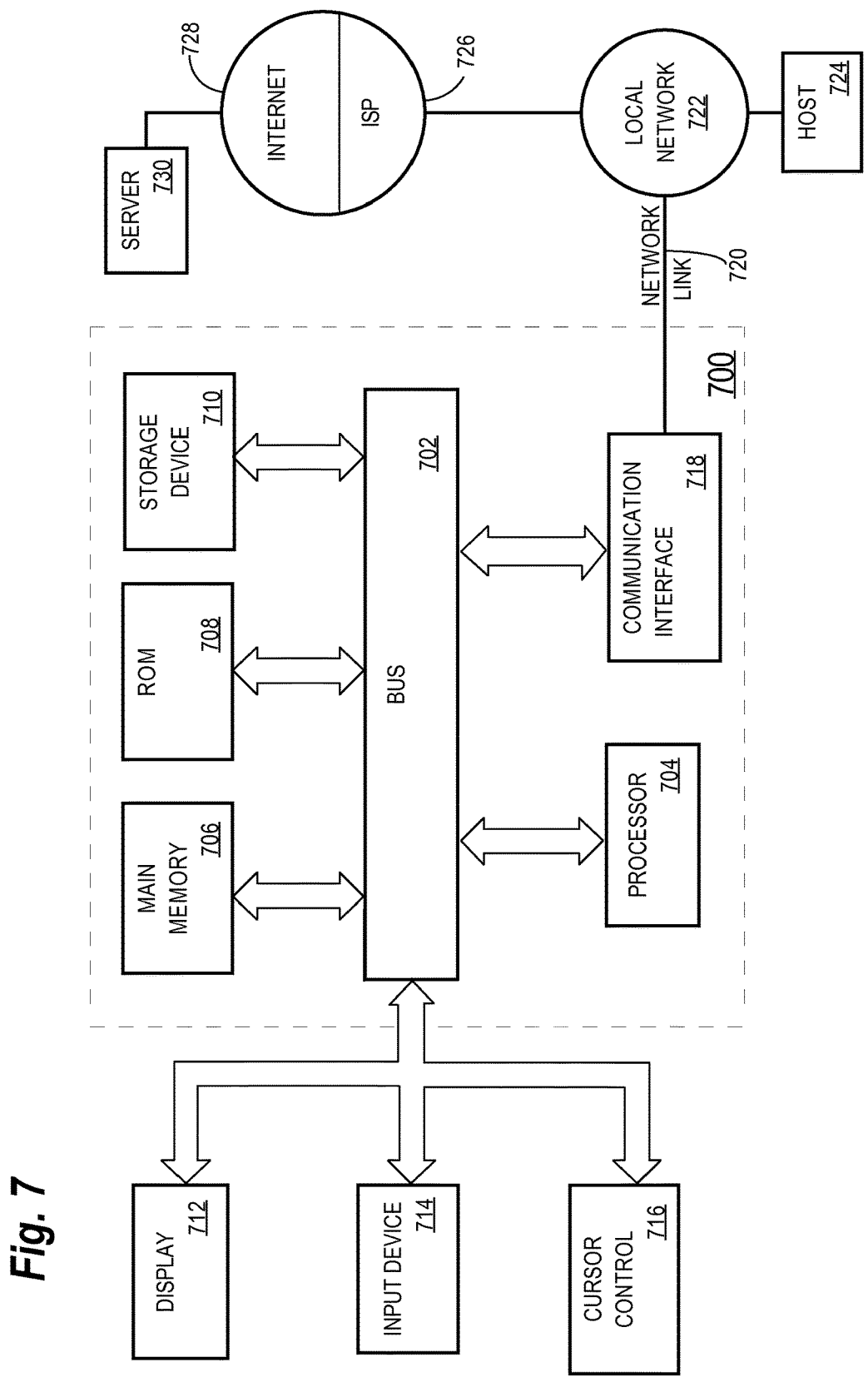
FIG. 7 is a block diagram of a computer system that may be used to implement the techniques described herein.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   populating in volatile memory, at least one table of two tables, based on a partition key;
   receiving a query that joins the two tables on a join key that is the same as the partition key;
   based on the query received, determining whether to use full or partial partition-wise join for the query;
   based on how the two tables are populated in-memory, generating a first cost estimate for a first query execution plan, of a plurality of query execution plans, that divides the query that joins the two tables into a plurality of partition-wise joins, each partition-wise join, of the plurality of partition-wise joins, between a pair of corresponding partitions from the two tables;
   generating a second cost estimate for a second query execution plan, of the plurality of query execution plans that divides the query into a plurality of slave processes for an in-memory scanning operation of at least one of the two tables and a join operation on individual portions the of the two tables;
   based on a lowest cost estimate of at least the first cost estimate and the second cost estimate, selecting a particular query execution plan among the plurality of query execution plans;
   maintaining, in a plurality of volatile memories of a plurality of host nodes, a first set of data that belongs to the at least one table;
   wherein each node of the plurality of host nodes has shared access to a same on-disk version of the first set of data and a second set of data that belongs to another table of the two tables;
   wherein generating the first cost estimate includes computing the cost of reading, from disk, a partition necessary for joining the two tables that is not located in a given volatile memory of a given host node assigned to perform work against that partition;
   wherein generating the second cost estimate includes computing the cost of redistributing the first set of data and the second set of data via interprocess communication;
   wherein the method is performed on one or more computing devices.

2. The method of claim 1, wherein the first cost estimate is based on a hybrid access involving both in-memory and on-disk portions of each partition for each table.

3. The method of claim 1, wherein determining the first cost further comprises computing an overhead cost of managing the plurality of host nodes.

4. The method of claim 1, wherein generating the first cost estimate further comprises computing the cost of, at least one of the plurality nodes, reading, from local volatile memory, at least one other partition.

5. The method of claim 1, wherein determining the first cost further comprises computing a cost of communication for a partial partition-wise join when data from one of the two tables is redistributed based on a partitioning scheme of another table of the two tables.

6. The method of claim 5, wherein the work for the processes on each node includes scan processes and join processes.

7. The method of claim 1, wherein generating the second cost estimate further comprises computing the cost of, at least one of the plurality nodes, reading, from local volatile memory, a portion of data necessary for a scan processes.

8. The method of claim 1, further comprising determining a join method for each query execution plan from a group of candidate methods consisting of a hash join, a merge-sort join, and a nested loop join based on a selectivity of a predicate in the query and a comparison operator in the predicate.

9. The method of claim 1, further comprising determining a degree of parallelism for the query based on an estimated cost and a time-threshold for running queries involving tables populated in volatile memory.

10. The method of claim 9, wherein a partition-wise join execution plan assigns unit of work to each node based on a distribution of data maintained in the volatile memories of the host nodes and the degree of parallelism.

11. The method of claim 1, wherein generating a query execution plan includes assigning tasks based on a distribution of in-memory data across the plurality of host nodes.

12. One or more non-transitory storage media storing instructions which, when executed by one or more computing devices, cause performance by the one or more computing devices of:
    populating in volatile memory, at least one table of two tables, based on a partition key;
    receiving a query that joins the two tables on a join key that is the same as the partition key;
    based on the query received, determining a whether to use full or partial partition-wise join for the query;
    based on how the two tables are populated in-memory, generating a first cost estimate for a first query execution plan, of a plurality of query execution plans, that divides the query that joins the two tables into a plurality of partition-wise joins, each partition-wise join, of the plurality of partition-wise joins, between a pair of corresponding partitions from the two tables;
    generating a second cost estimate for a second query execution plan, of the plurality of query execution plans, that divides the query into a plurality of slave processes for an in-memory scanning operation of at least one of the two tables and a join operation on individual portions the of the two tables;
    based on a lowest cost estimate of at least the first cost estimate and the second cost estimate, selecting a particular query execution plan among the plurality of query execution plans;
    maintaining, in a plurality of volatile memories of a plurality of host nodes, a first set of data that belongs to the at least one table;
    wherein each node of the plurality of host nodes has shared access to a same on-disk version of the first set of data and a second set of data that belongs to the other table of the two tables;
    wherein the first cost estimate includes computing the cost of reading, from disk, a partition necessary for joining the two tables that are not located in a given volatile memory of a given host node assigned to perform work against that partition;
    wherein the second cost estimate includes computing the cost of redistributing the first set of data and the second set of data via interprocess communication.

13. The one or more non-transitory storage media storing instructions of claim 12, wherein the first cost estimate is based on a hybrid access involving both in-memory and on-disk portions of each partition for each table of the two tables.

14. The one or more non-transitory storage media storing instructions of claim 12, wherein determining the first cost further comprises computing an overhead cost of managing the plurality of host nodes.

15. A method comprising:
    maintaining, in a plurality of volatile memories from a plurality of host nodes, a first set of data that belongs to a first partitioned object;
    wherein each node of the plurality of host nodes has shared access to a same on-disk version of the first set of data and a second set of data that belongs to a second partitioned object;
    receiving, at a node of the plurality of host nodes, a join query that requires work to be performed on:
        the first set of data that belongs to the first partitioned object, and
        the second set of data that belongs to the second partitioned object;
    determining a first cost of performing a partition-wise join query execution plan against the first set of data and the second set of data;
    determining a second cost for performing a non-partition-wise join query execution plan against the first set of data and the second set of data;
    comparing the first cost with the second cost; and
    based on the comparison, selecting either the partition-wise join query execution plan or the non-partition-wise join query execution plan;
    wherein the partition-wise join query execution plan is a fully in-memory partition-wise join query execution plan, and the method includes selecting the partition-wise join query execution plan;
    wherein the first cost includes computing the cost of reading, from disk, any partitioned data necessary for the partition-wise join that is not located in a given volatile memory of a given host node assigned to perform work against that partitioned data;
    wherein the second cost includes computing the cost of performing an interprocess communication for redistributing the first set of data.

16. One or more non-transitory storage media storing instructions which, when executed by one or more computing devices, cause performance by the one or more computing devices of:
    maintaining, in a plurality of volatile memories from a plurality of host nodes, a first set of data that belongs to a first partitioned object;
    wherein each node of the plurality of host nodes has shared access to a same on-disk version of the first set of data and a second set of data that belongs to a second partitioned object;
    receiving, at a node of the plurality of host nodes, a join query that requires work to be performed on:
        the first set of data that belongs to the first partitioned object, and
        the second set of data that belongs to the second partitioned object;

determining a first cost of performing a partition-wise join query execution plan against the first set of data and the second set of data;

determining a second cost for performing a non-partition-wise join query execution plan against the first set of data and the second set of data;

comparing the first cost with the second cost; and based on the comparison, selecting either the partition-wise join query execution plan or the non-partition-wise join query execution plan;

wherein the partition-wise join query execution plan is a fully in-memory partition-wise join query execution plan, and the executed instructions also cause selecting the partition-wise join query execution plan;

wherein the first cost includes computing the cost of reading, from disk, any partitioned data necessary for the partition-wise join that is not located in a given volatile memory of a given host node assigned to perform work against that partitioned data;

wherein the second cost includes computing the cost of performing an interprocess communication for redistributing the first set of data.

* * * * *

UNITED STATES PATENT AND TRADEMARK OFFICE
CERTIFICATE OF CORRECTION

PATENT NO. : 10,025,822 B2  
APPLICATION NO. : 14/806601  
DATED : July 17, 2018  
INVENTOR(S) : Das et al.

Page 1 of 1

It is certified that error appears in the above-identified patent and that said Letters Patent is hereby corrected as shown below:

In the Drawings

Figure 8:
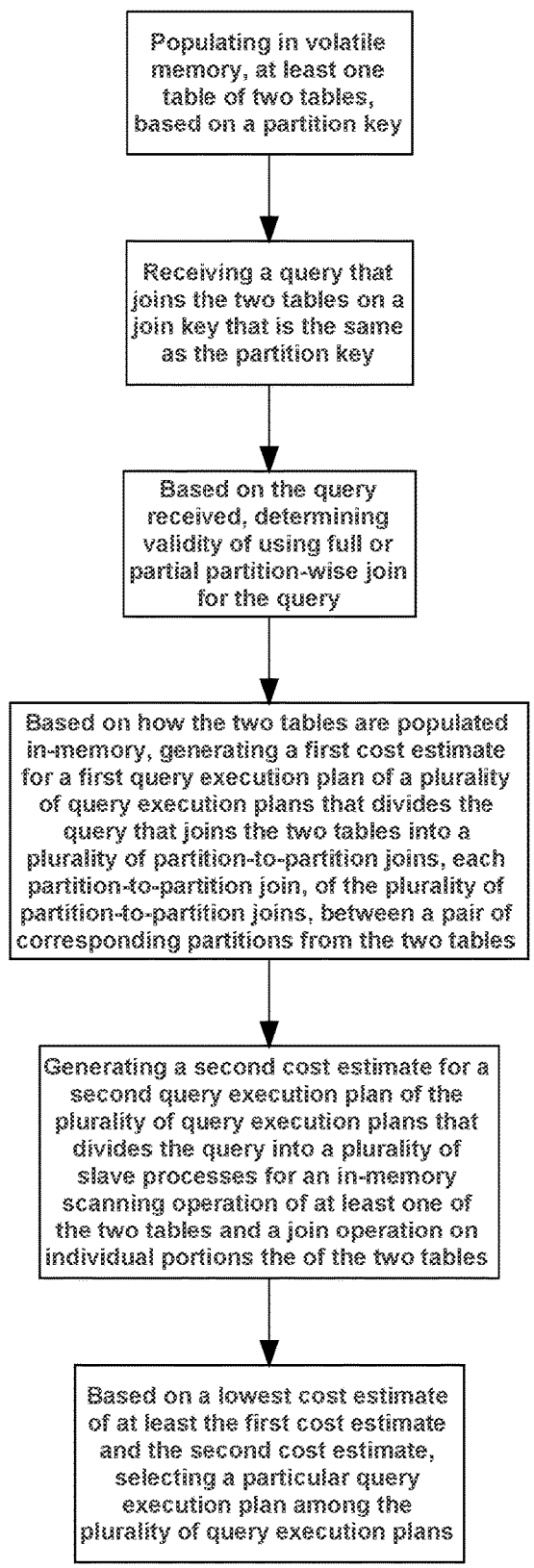
FIG. 8 is a block diagram of a process for the techniques described herein.

On sheet 8 of 8, in FIG. 8, Line 30, delete "the of the" and insert -- of the --, therefor.

In the Specification

Column 15, Line 9, delete "Partions" and insert -- Partitions --, therefor.

Column 15, Line 12, delete "Partions" and insert -- Partitions --, therefor.

Column 15, Line 15, delete "Partions" and insert -- Partitions --, therefor.

In the Claims

Column 20, Line 29, Claim 1, delete "plans that" and insert -- plans, that --, therefor.

Column 20, Line 32, Claim 1, delete "the of the" and insert -- of the --, therefor.

Column 21, Line 51, Claim 12, delete "the of the" and insert -- of the --, therefor.

Signed and Sealed this  
Second Day of April, 2019

Andrei Iancu  
*Director of the United States Patent and Trademark Office*